Oct. 30, 1934.  F. J. LYNCH  1,978,639
HEAT RECLAIMER
Filed May 23, 1933  3 Sheets-Sheet 1

Inventor
F. J. Lynch
By Clarence A. O'Brien
Attorney

Oct. 30, 1934.　　　F. J. LYNCH　　　1,978,639
HEAT RECLAIMER
Filed May 23, 1933　　3 Sheets-Sheet 2

Inventor
F. J. Lynch
By Clarence A. O'Brien
Attorney

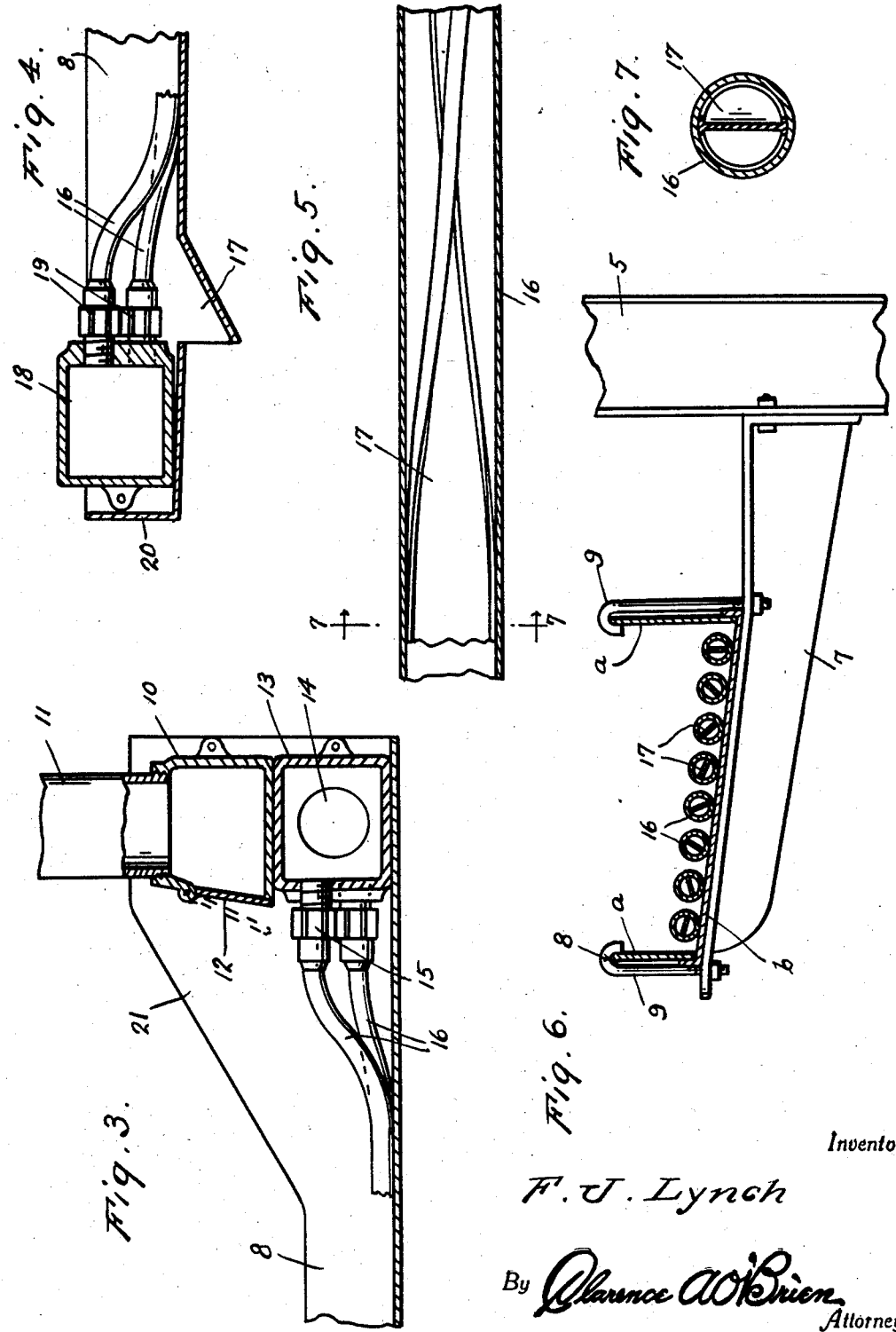

Patented Oct. 30, 1934

1,978,639

UNITED STATES PATENT OFFICE 1,978,639

HEAT RECLAIMER

Francis John Lynch, Kansas City, Mo.

Application May 23, 1933, Serial No. 672,492

1 Claim. (Cl. 257—242)

This invention appertains to new and useful improvements in means for reclaiming heat from waste materials, the principal object being to provide a device whereby the waste heat remaining in any liquid or free flowing solution or substance after processing may be reclaimed by transference by conduction through the walls of conduits to a cooler liquid which in this form can be utilized for commercial purposes.

Other important objects and advantages of the invention will become apparent to the reader of the following specification.

In the drawings:—

Figure 3 represents a fragmentary vertical sectional view taken substantially on line 3—3 of Figure 2.

Figure 4 represents a vertical sectional view taken substantially on line 4—4 of Figure 1.

Figure 5 represents a fragmentary longitudinal sectional view through one of the tubes.

Figure 6 represents a cross sectional view taken substantially on line 6—6 of Figure 2.

Figure 7 represents a cross sectional view taken substantially on line 7—7 of Figure 5.

Figure 1:
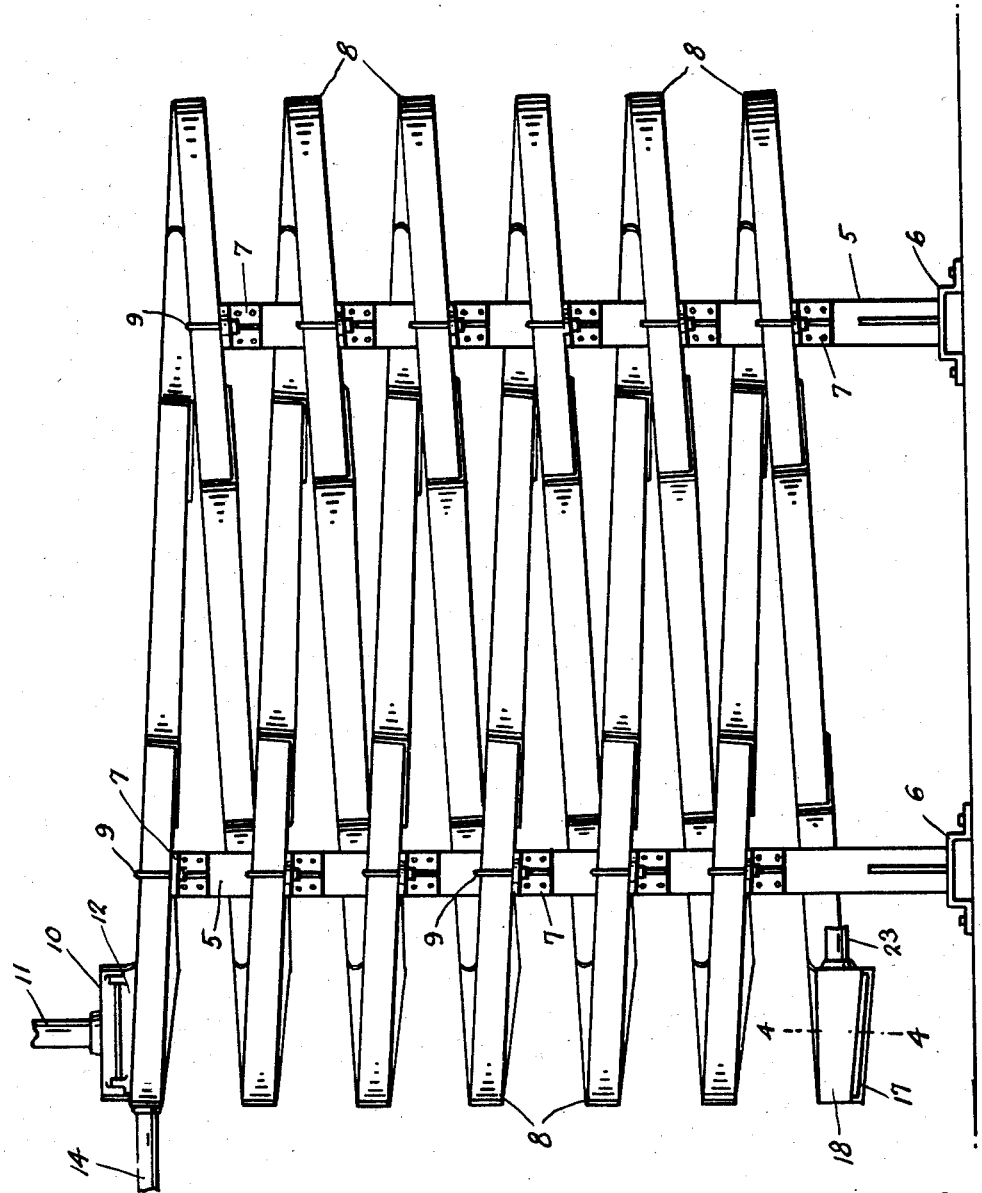
Figure 1 represents a side elevational view of the apparatus.

Referring to the drawings, wherein like numerals designate like parts, it can be seen that numerals 5—5 denote uprights supported on bases 6, these uprights each consisting of a pair of channel irons secured back to back.

Each of these uprights 5 has a plurality of arms 7 extending laterally therefrom in opposite directions for supporting the trough 8, this trough having side walls $a$—$a$ and the bottom wall $b$, the trough being secured to the arms 7 by hook bolts 9 extending over the side walls and through the arms 7, in the manner shown in Figure 6.

Figure 2:
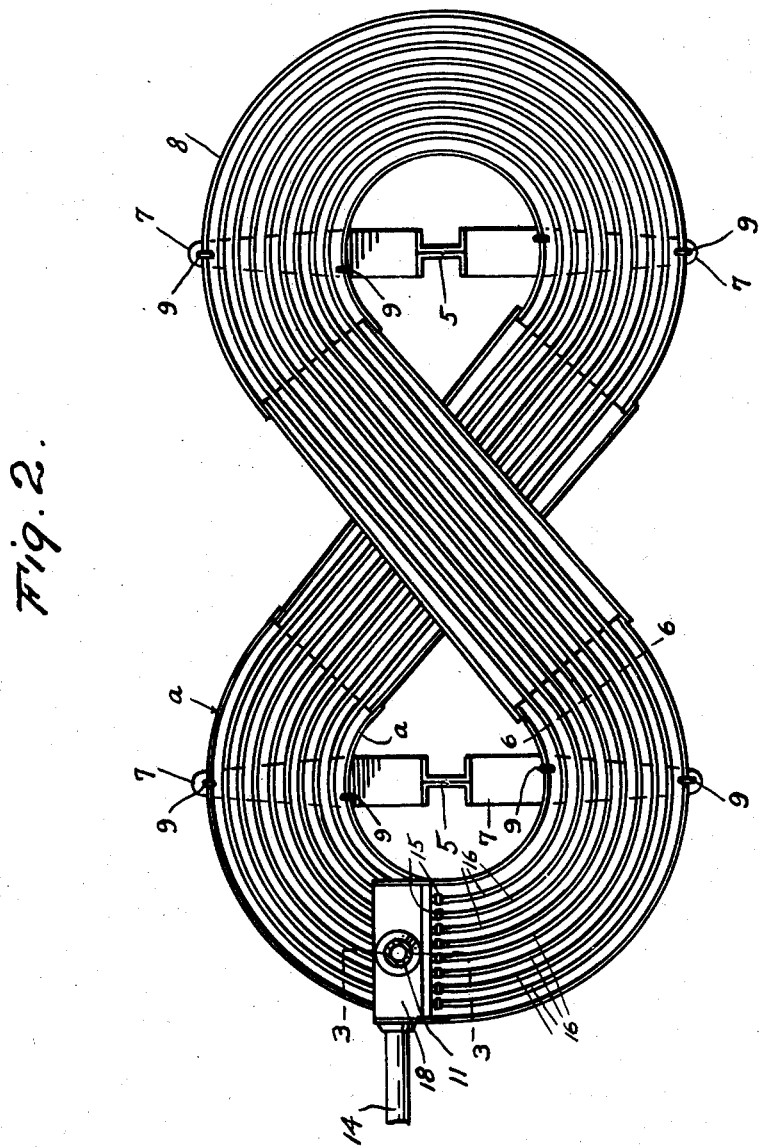
Figure 2 represents a top plan view of the apparatus.

The trough 8, while of a figure 8 construction, is made up of a plurality of convolutions in piled formation having an inlet at its upper end and an outlet at its lower end. The upper end is clearly shown in Figure 3 and includes the waste material inlet header 10, with the supply pipe 11 leading thereto. Numeral 12 represents a trap door which is opened by the flow of the heated waste material from the header 10. This header 10 rests upon the cool water header 13 which has an inlet conduit 14. Couplings 15 connect the header 13 to a plurality of tubes 16 which extend along the bottom of the trough 8, in the manner clearly shown in Figures 2 and 6. Each of these tubes 6 has a partition 17 which spirals one revolution about every eighteen inches.

At the lower end of the trough, as shown in Figure 4, the bottom is depressed to provide an outlet opening 17, while upon this end of the trough is situated the receiving header 18 to which the lower ends of the tubes 16 are connected by suitable couplings 19. The lower end of the trough 8 is closed, as at 20, while the upper end is provided with elevated side walls 21 which, of course, prevent slushing out of the trough of material discharging from the header 10.

Obviously, the hot material gravitating down the trough, will transfer heat, by way of conductivity, through the tubes to the liquid running therein and this heated liquid is taken off by way of the pipe 23 leading from the receiving header 18 at the lower end of the trough.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A heat exchanging apparatus comprising an elongated trough of substantially figure 8 shape in plan, said trough being inclined throughout its entire length, an inlet at the upper end of the trough, an outlet at the lower end of the trough, said inlet end of the trough being spaced above the outlet end, and a heat transference tube extending longitudinally through the trough.

FRANCIS JOHN LYNCH.